United States Patent
Kim et al.

(10) Patent No.: US 8,318,345 B2
(45) Date of Patent: Nov. 27, 2012

(54) ELECTRODE ASSEMBLY AND LITHIUM RECHARGEABLE BATTERY USING THE SAME

(75) Inventors: Jong Ku Kim, Cheonan-si (KR); Hyoung Su Kim, Cheonan-si (KR)

(73) Assignee: Samsung SDI Co., Ltd., Suwon (KR)

( * ) Notice: Subject to any disclaimer, the term of this patent is extended or adjusted under 35 U.S.C. 154(b) by 2421 days.

(21) Appl. No.: 11/191,018

(22) Filed: Jul. 28, 2005

(65) Prior Publication Data
US 2006/0040181 A1    Feb. 23, 2006

(30) Foreign Application Priority Data
Jul. 29, 2004   (KR) .................. 10-2004-0059959

(51) Int. Cl.
*H01M 4/02* (2006.01)
*H01M 2/02* (2006.01)

(52) U.S. Cl. ........ 429/211; 429/164; 429/209; 429/122; 29/623.1

(58) Field of Classification Search ............... 429/122, 429/164, 209, 211; 29/623.1
See application file for complete search history.

(56) References Cited

U.S. PATENT DOCUMENTS

| | | | |
|---|---|---|---|
| 4,586,053 A * | 4/1986 | Hughes | 347/256 |
| 5,202,199 A * | 4/1993 | Mitzutani et al. | 429/176 |
| 6,051,338 A * | 4/2000 | Miyazaki et al. | 429/211 |
| 2003/0035993 A1 * | 2/2003 | Enomoto et al. | 429/66 |
| 2003/0091901 A1 * | 5/2003 | Kaneda et al. | 429/231.4 |

FOREIGN PATENT DOCUMENTS

| | | |
|---|---|---|
| CN | 1516300 | 7/2004 |
| JP | 60-188469 | 12/1985 |
| JP | 10-064525 | 3/1998 |
| JP | 3062385 | 7/1999 |
| JP | 2000-021452 | 1/2000 |
| JP | 2002-184464 | 6/2002 |
| JP | 2004-134197 | 4/2004 |
| JP | 2004134197 A * | 4/2004 |
| JP | 2004-158439 | 6/2004 |
| WO | WO 0139299 A1 * | 5/2001 |

OTHER PUBLICATIONS

Notice of Allowance of Japanese Application No. 2005-094955 issued on May 10, 2011.
Non-Final Office Action dated Aug. 24, 2012 issued for U.S. Appl. No. 13/565,578.

* cited by examiner

*Primary Examiner* — Barbara Gilliam
*Assistant Examiner* — Edu E Enin-Okut
(74) *Attorney, Agent, or Firm* — H.C. Park & Associates, PLC

(57) ABSTRACT

An electrode assembly comprising an electrode tab or an electrode plate substrate which has an identification mark formed thereon and a lithium rechargeable battery using the same are disclosed. This identification mark makes it possible to easily check the record of the manufacturing processes of the battery, including production equipment, production date, line operators, and production lines when a battery malfunctions. This identification mark may prevent a replica of the defective component from being manufactured.

2 Claims, 7 Drawing Sheets

ELECTRODE ASSEMBLY AND LITHIUM RECHARGEABLE BATTERY USING THE SAME

CROSS-REFERENCE TO RELATED APPLICATIONS

This application claims priority to Korean Patent Application No.: 10-2004-0059959 filed on Jul. 29, 2004, the contents of which are herein incorporated by reference in their entirety.

BACKGROUND OF THE INVENTION

1. Field of the Invention

The present invention relates to an electrode assembly and a lithium rechargeable battery using the same. In particular, the present invention relates to an electrode assembly comprising an electrode tab or an electrode plate substrate that has an identification mark formed thereon and a lithium rechargeable battery using the same.

2. Description of the Prior Art

With the recent advancement of electronic technologies, particularly portable electronic devices, rechargeable batteries that are used to power these devices have also improved considerably. Lithium rechargeable batteries are some of the most widely-used batteries because of their excellent characteristics including high operating voltage, long service life, and high energy density.

In the lithium rechargeable batteries, positive electrodes and negative electrodes comprise materials that enable lithium ions to be reversibly inserted into and separated from them. The space between the positive electrode and the negative electrode is filled with an organic electrolyte or a polymer electrolyte. As the lithium ions are inserted into and separated from the positive electrode and the negative electrode, oxidation and reduction reactions occurring at the electrodes generate electrical energy.

In general, the bare cell of a lithium rechargeable battery is formed by placing an electrode assembly comprised of a positive electrode, a negative electrode, and a separator into a can. The can may comprise aluminum or an aluminum alloy. The can is sealed with a cap assembly and an electrolyte is injected into the can. Aluminum or an aluminum alloy may be used to form the can because they are lightweight and corrosion resistant even at high operating voltages during a long operating time. This reduces the overall weight of the battery.

The bare cell generally comprises an electrode terminal that is positioned on top of the bare cell to insulate it from its surroundings. The electrode terminal is coupled with an electrode of the electrode assembly in the bare cell and constitutes either the positive terminal or the negative terminal of the battery. The can itself has the opposite polarity of the electrode terminal.

Referring to FIG. 1, a rectangular-type lithium rechargeable battery 10 according to the prior art includes a can 11, an electrode assembly 12 contained in the can 11, and a cap assembly 100 that is coupled to the can 11.

The can 11 is a rectangular-type case that is made of metallic material. The electrode assembly 12 is formed by laminating a positive electrode plate 13, a separator 14, and a negative electrode plate 15 and winding them into a roll. The electrode assembly 12 is contained in the can 11. The positive electrode tab 16 and negative electrode tab 17 are drawn from the positive electrode plate 13 and negative electrode plate 15, respectively.

The cap assembly 100 includes a cap plate 110 that is coupled to the top of the can 11 and an electrode terminal 130 that is inserted into a terminal through-hole 111 that is formed at the center of the cap plate 110. The cap assembly further includes an insulation plate 140 that is positioned on the lower surface of the cap plate 110 and a terminal plate 150 that is positioned on the lower surface of the insulation plate 140 while being coupled to the electrode terminal 130. A cylindrical gasket 120 is positioned on the outer surface of the electrode terminal 130 to insulate between the electrode terminal and the cap plate 110.

The cap plate 110 has an electrolyte injection hole 112 that is formed therein to provide a passage through which an electrolyte can be injected into the can 11. A ball 160 is coupled with the electrolyte injection hole 112 to seal it.

The positive electrode tab 16 is coupled with the bottom surface of the cap plate 110 and the negative electrode tab 17 is coupled with the electrode terminal 130 via the terminal plate 150. The connection positions of the positive electrode tab 16 and the negative electrode tab 17 may be switched. An insulation tape 18 is wound around a portion through which the positive electrode tab 16 and the negative electrode tab 17 are drawn from the electrode assembly 12 to prevent a short circuit between the positive electrode plate 13 and negative electrode plate 15. The can 11 has an insulation case 30 that is positioned on top of the electrode assembly 12 to insulate between the electrode assembly 12 and the cap assembly 100.

Since batteries store energy, they have the potential to release a large amount of energy. For example, rechargeable batteries accumulate a large amount of energy when they have been charged or during a charging process where they are supplied with energy from other energy source. If any malfunction such as an internal short circuit occurs in the rechargeable batteries during such a process, the accumulated energy may be released quickly and cause a safety problem such as fire or explosion.

Lithium rechargeable batteries are equipped with a safety device to avoid fire or an explosion caused by a malfunction in the batteries when they have been charged or during the charging process. For example, a protective circuit senses abnormal current or voltage and interrupts the flow of current. Other safety devices include a bimetal and a positive temperature coefficient device which is actuated by overheating caused by abnormal currents.

In spite of these precautions, almost all components of batteries are damaged by heat in the event of a fire or other damage to the batteries, which makes it difficult to analyze the cause.

SUMMARY OF THE INVENTION

The present invention provides an electrode assembly that makes it possible to easily verify the manufacturing processes of the battery including production equipment, production date, operators, and production lines. Thus, if a problem occurs due to a malfunction of the battery, the production of replicas may be prevented.

The present invention also provides a lithium rechargeable battery that uses the electrode assembly.

Additional features of the invention will be set forth in the description which follows, and in part will be apparent from the description, or may be learned by practice of the invention.

The present invention discloses an electrode assembly comprising a positive electrode plate that has a positive electrode collector, positive electrode active materials that are applied to the positive electrode collector, and a positive electrode tab that is coupled with a positive electrode uncoated portion that has no positive electrode active material applied to it. The electrode assembly further comprises a negative electrode plate that has a negative electrode collector, negative electrode active materials applied to the negative electrode collector, and a negative electrode tab that is coupled with a negative electrode uncoated portion that has no negative electrode active material applied to it. In addition, the electrode assembly comprises a separator that is interposed between the positive electrode plate and the negative electrode plate to insulate them from each other while being wound together with them. An identification mark is formed on at least one of the positive electrode tab, the negative electrode tab, the positive electrode uncoated portion, and the negative electrode uncoated portion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Figure 1:
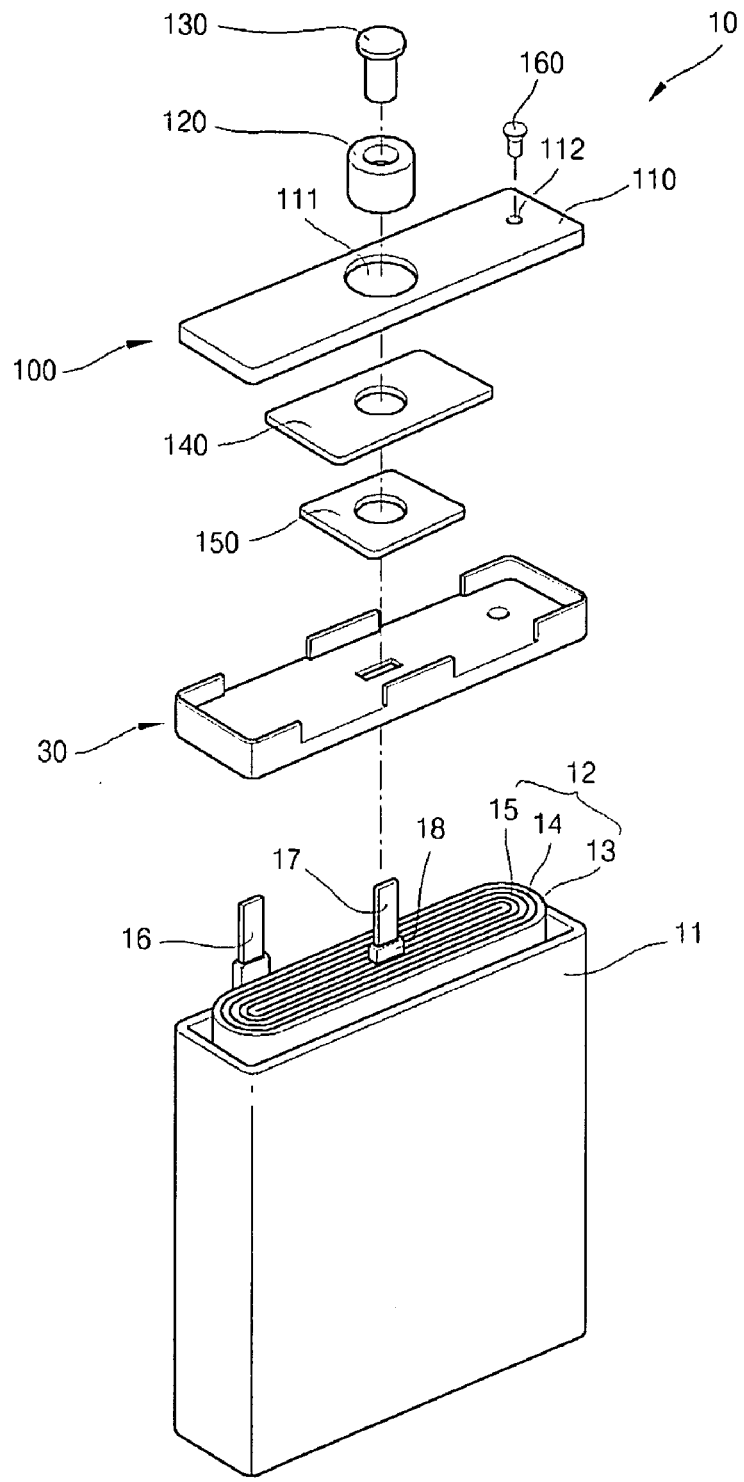
FIG. 1 is an exploded perspective view of a conventional rectangular box-type lithium rechargeable battery.

FIG. 2, FIG. 3, FIG. 4, and FIG. 5 are exploded perspective views of an electrode assembly according to exemplary embodiments of the present invention. FIG. 6a and FIG. 6b are sectional views taken along line A-A of FIG. 4 of a negative electrode tab according to an exemplary embodiment of the present invention.

Referring to the drawings, an electrode assembly 20 is formed by winding the positive electrode plate 21 and the negative electrode plate 23 with a separator 22 that is interposed between them into a jelly-roll.

The positive electrode plate 21 has a positive electrode collector 21a and a positive electrode coated portion 21b that is applied to at least one surface of the positive electrode collector 21a.

The positive electrode collector 21a may comprise, but is not limited to stainless steel, nickel, aluminum, titanium, or an alloy thereof. It may also comprise aluminum or stainless steel that has been surface-treated with carbon, nickel, titanium, or silver. Aluminum or an aluminum alloy is preferably used in the positive electrode collector 21a.

The positive electrode active materials may be applied using a positive electrode slurry composition comprising a lithium-based metal oxide, a binder, and a conductive agent that are dispersed into a solution. After being applied to at least one surface of the positive electrode collector 21a, the positive electrode slurry composition is dried and rolled to form the positive electrode coated portion 21b. The positive electrode plate 21 has a positive electrode tab 26 that is attached to the positive electrode uncoated portion 21c. The positive electrode tab 26 preferably comprises aluminum or an aluminum alloy.

The negative electrode plate 23 has a negative electrode collector 23a and a negative electrode coated portion 23b that is applied to at least one surface of the negative electrode collector 23a.

The negative electrode collector 23a may comprise, but is not limited to stainless steel, nickel, copper, titanium, or an alloy thereof. It may also comprise copper or stainless steel that has been surface-treated with carbon, nickel, titanium, or silver. Copper or copper alloy is preferably used in the negative electrode collector 23a.

The negative electrode active materials may be applied using a negative electrode slurry composition comprising a negative electrode active material such as a carbon material, a binder, and a conductive agent that are dispersed into a solution. After being applied to at least one surface of the negative electrode collector 23a, the negative electrode slurry composition is dried and rolled to form the negative electrode coated portion 23b. The negative electrode plate 23 has a negative electrode tab 27 that is attached to the negative electrode uncoated portion 23c. The negative electrode tab 27 preferably comprises nickel or a nickel alloy.

The positive electrode collectors 21a and the negative electrode collectors 23a may comprise a foil, film, sheet, mesh, punched substance, porous substance, and blown substance.

The positive electrode tab 26 and the negative electrode tab 27 are coupled with a surface of the positive uncoated portion 21c and the negative uncoated portion 23c, respectively. They may be coupled through various methods, including but not limited to spot welding, laser welding, and ultrasonic welding, or using a conductive adhesive. The conductive adhesive may be a conductive paste that is prepared by uniformly mixing a metal powder that has excellent conductivity such as silver and nickel with carbon and dispersing it into a composite resin. The composite resin may have excellent adhesive properties such as epoxy resin, acryl resin, and modified urethane resin and composite rubber, for example.

The separator 22 is interposed between the positive electrode plate 21 and the negative electrode plate 23 to separate them from each other, to prevent a short circuit between them, and to provide a flow path for lithium ions. For example, the separator 22 may comprise a polymer film such as polyolefin, polyethylene, and polypropylene, a composite film thereof, a fine porous film, a woven fabric, or a non-woven fabric.

According to the present invention, an identification mark may be formed on at least one of the positive electrode tab 26, the negative electrode tab 27, the positive uncoated portion 21c, and the negative uncoated portion 23c. Although most components of batteries are severely damaged by heat when a fire or an explosion occurs due to malfunction of the batteries, the positive electrode tab, the negative electrode tab, the positive uncoated portion, and the negative uncoated portion, which comprise metals, are hardly damaged.

When an identification mark is formed on one of these components, the records of its manufacturing processes may be checked in the event of a malfunction to trace the cause of the problem more easily. The identification mark may identify relevant information including production equipment, production lines, line operators, and production date. This may also prevent a replica of the malfunctioning device from being made. The identification mark may comprise, but is not limited to a numeral, a character, a symbol, a figure, protrusions, perforations, a bar code or another optically recognizable mark, or any combination thereof, for example. The identification mark may be formed using a laser, fine punching, or embossing depending on the shape and material properties but is not limited therein.

Figure 2:
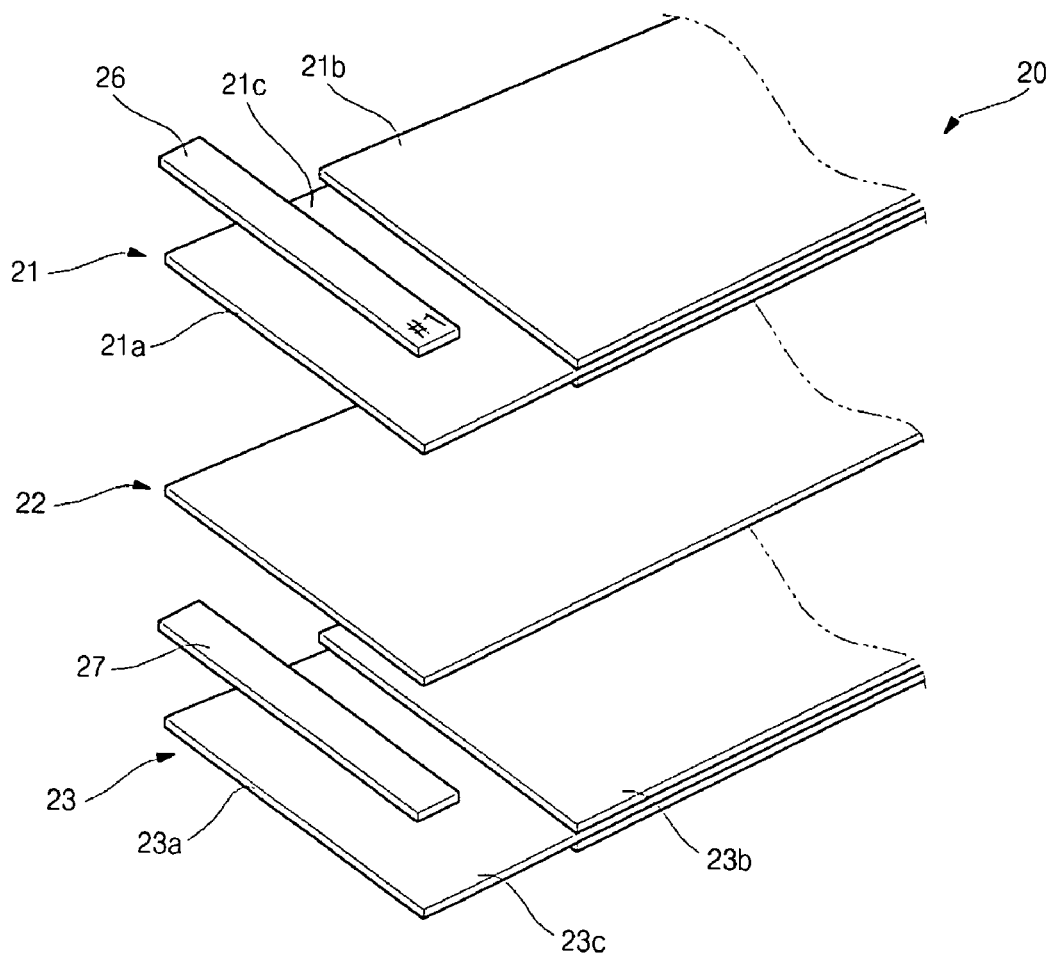
FIG. 2 is an exploded perspective view of an electrode assembly according to an exemplary embodiment of the present invention.

In FIG. 2, an identification mark is formed on the lower end of the positive electrode tab 26 in a combination of a symbol and a numeral. However, the position of the identification mark is not limited herein and may be properly chosen considering the contact portion between the electrode tabs and the electrode uncoated portions. In addition, the identification mark may be positioned on the can, cap plate, insulation plate, terminal plate, insulation case, or other components of the battery, for example.

Figure 3:
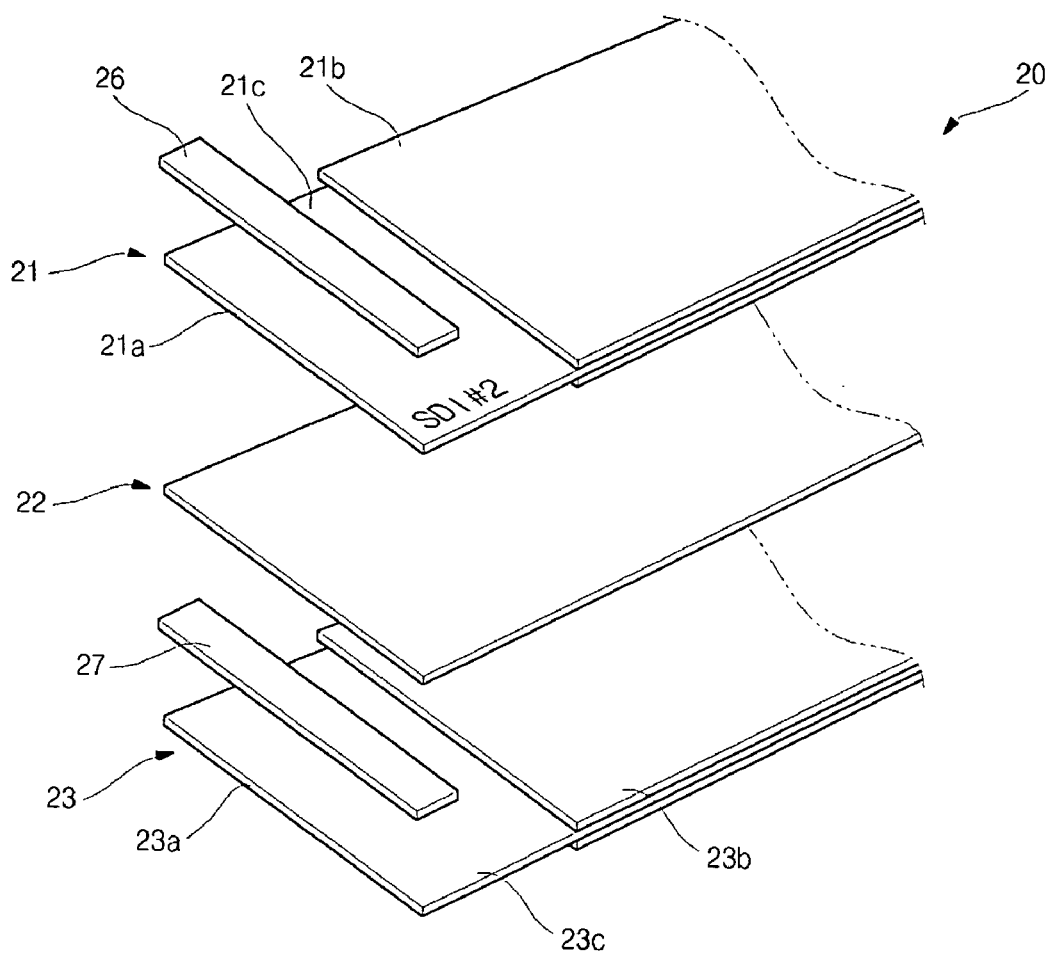
FIG. 3 is an exploded perspective view of an electrode assembly according to another exemplary embodiment of the present invention.

In FIG. 3, an identification mark is formed on the lower end of the positive electrode uncoated portion 21c in a combination of characters, numerals, and a symbol. However, the position of the identification mark is not limited herein and may be selected considering the attachment position of the electrode tabs.

The identification marks of FIG. 2 and FIG. 3 may be formed by laser marking which can inscribe figures, symbols, numerals, and characters on metal plates. Laser marking uses a principle wherein various shapes are engraved in intaglio on the surface of a material depending on the wavelength and frequency of the laser light. Since the laser marking adopts a non-contact marking mode, it generates no static electricity, performs at high speed, and the resulting mark has excellent resistance to wear.

Figure 4:
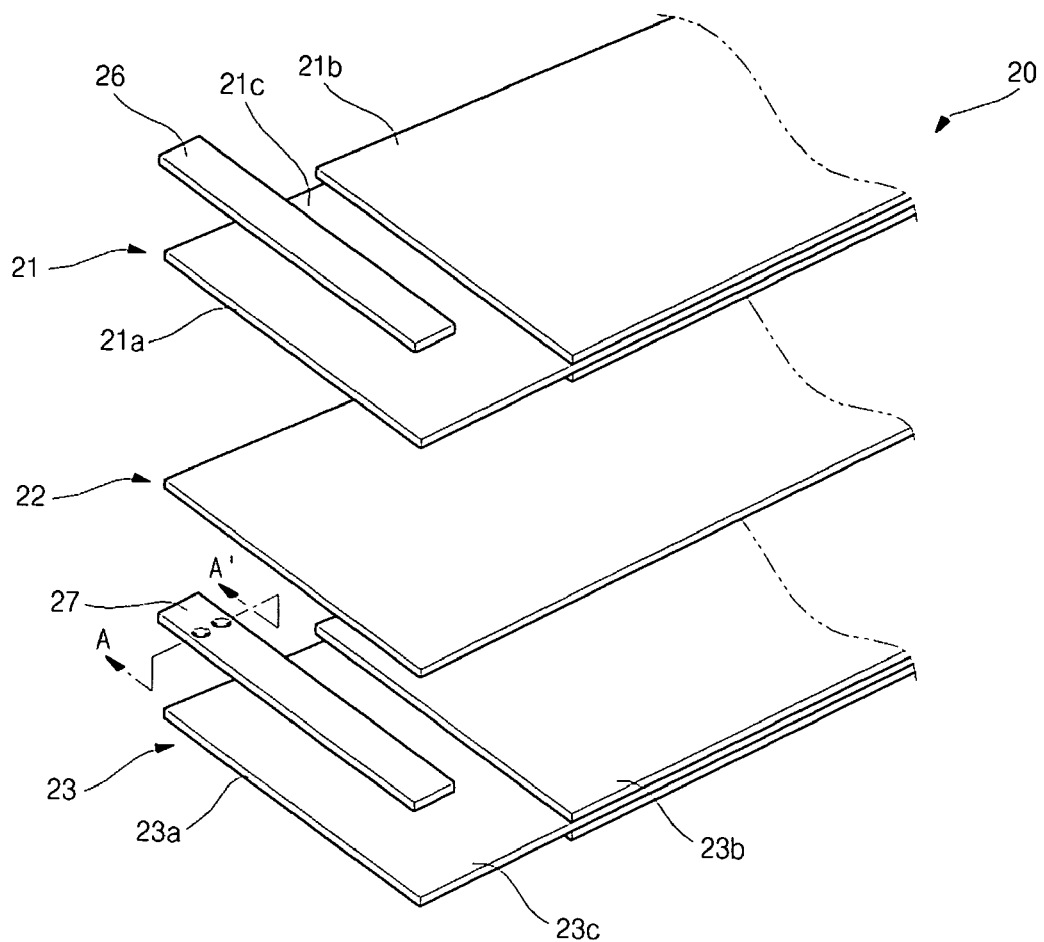
FIG. 4 is an exploded perspective view of an electrode assembly according to another exemplary embodiment of the present invention.
Figure 5:
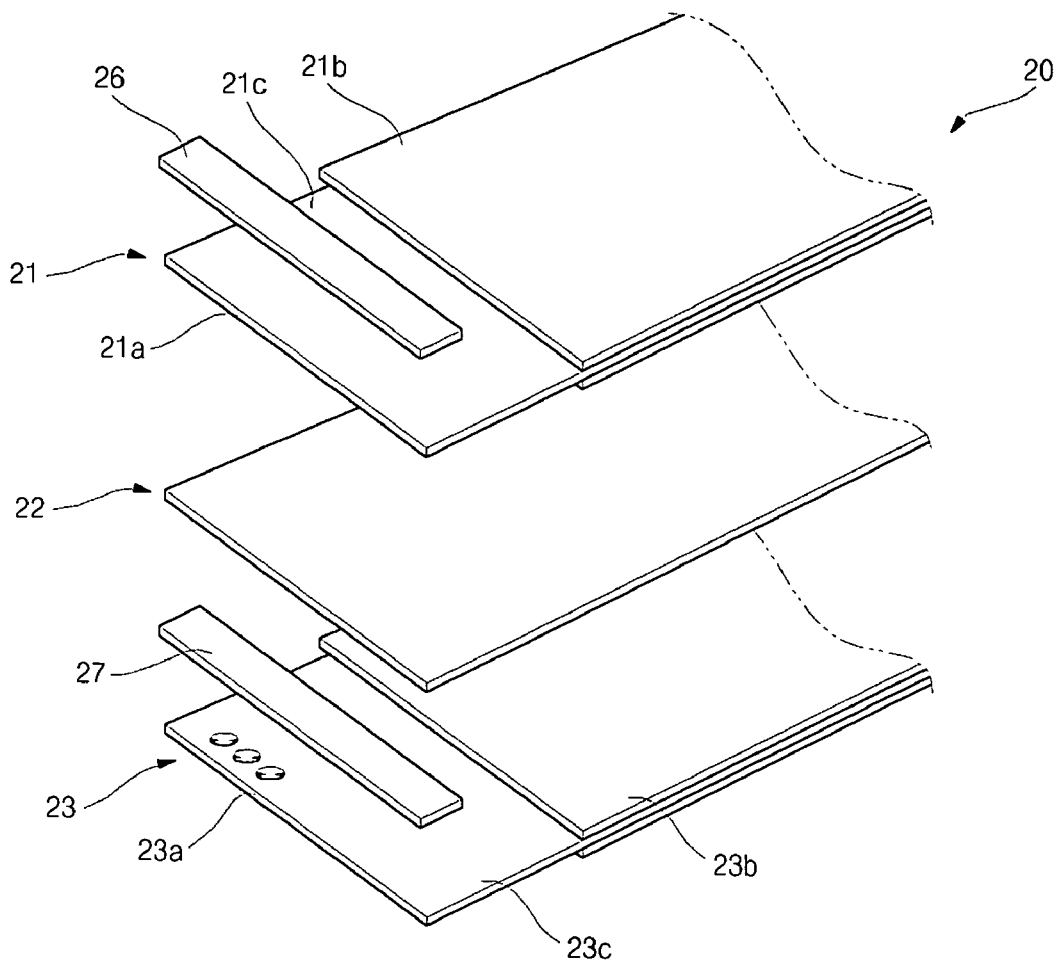
FIG. 5 is an exploded perspective view of an electrode assembly according to another exemplary embodiment of the present invention.
Figure 6A:
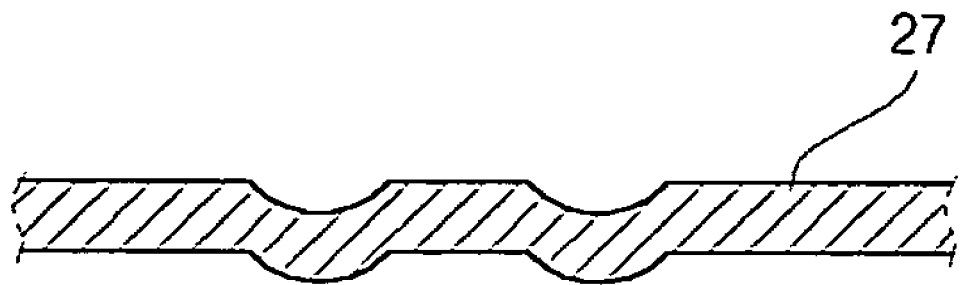
FIG. 6A is a sectional view taken along line A-A of FIG. 4 showing a negative electrode tab according to an exemplary embodiment of the present invention.
Figure 6B:
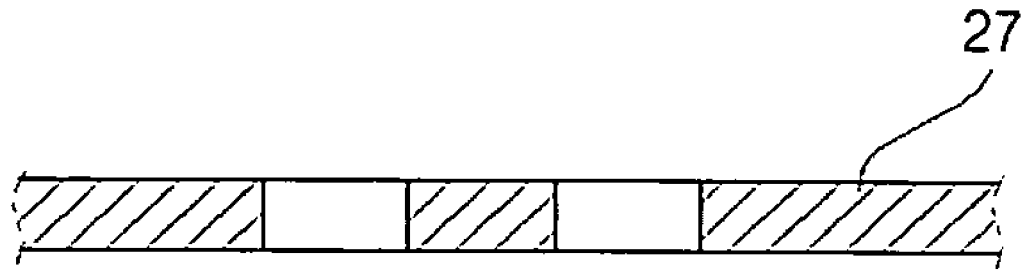
FIG. 6B is a sectional view taken along line A-A of FIG. 4 showing a negative electrode tab according to another exemplary embodiment of the present invention.

FIG. 4 and FIG. 5 show embodiments of the present invention wherein identification marks are formed on the upper portion of the negative electrode tab 27 and the lateral portion of the negative electrode uncoated portion 23c, respectively, in the form of perforations or protrusions processed by fine punching or embossing. The perforations or protrusions are formed by fine punching or embossing and may comprise various shapes including a circle, an eclipse, and a square. The size and number thereof are not limited to the embodiments as shown.

FIG. 6A and FIG. 6B are sectional views taken along line A-A of FIG. 4 showing the negative electrode tab 27 that has an identification mark that is formed in the shape of protrusions and perforations, respectively.

Figure 7:
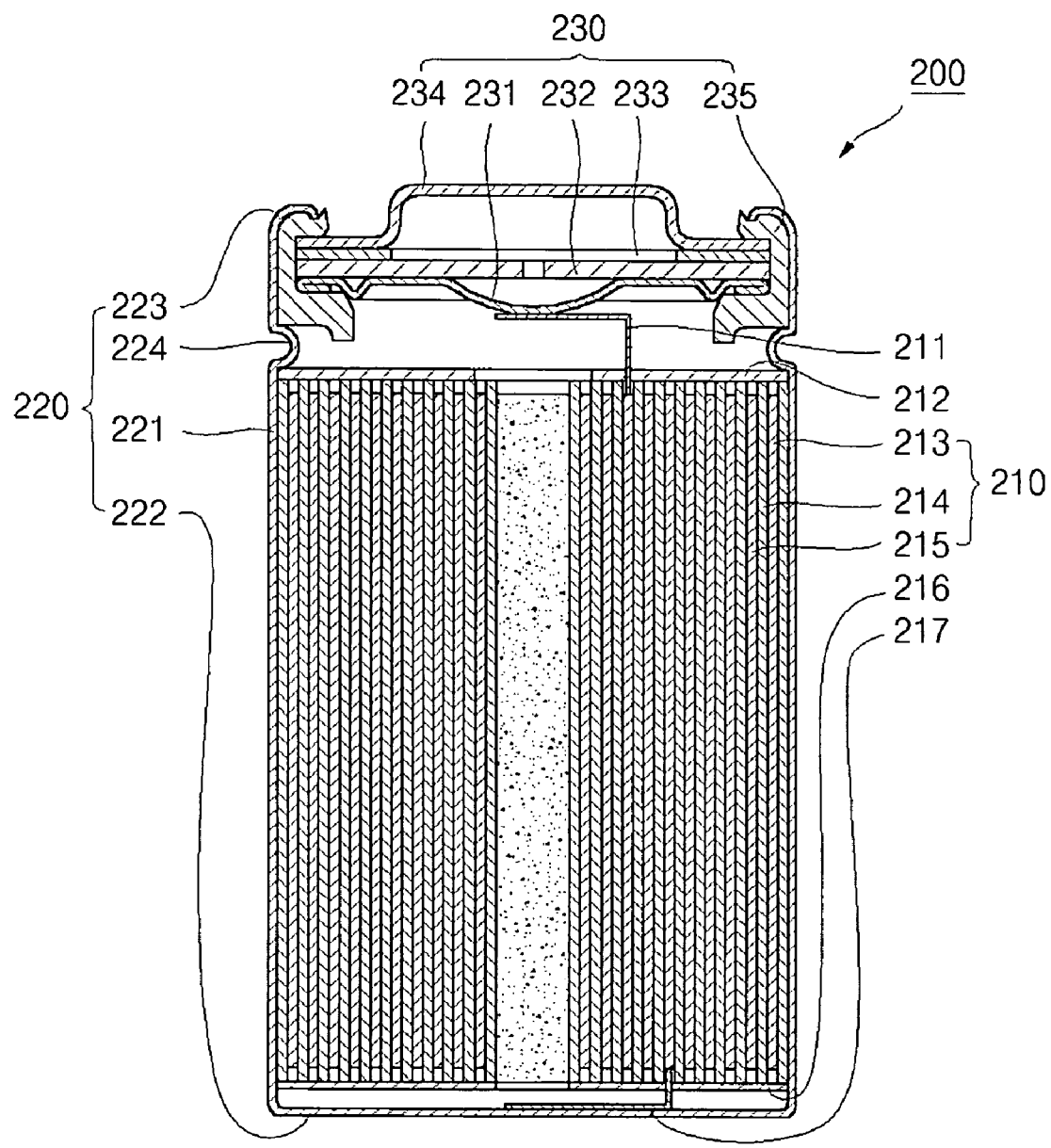
FIG. 7 is a sectional view of a cylindrical lithium rechargeable battery according to another exemplary embodiment of the present invention.

FIG. 7 is a sectional view of a cylindrical lithium rechargeable battery according to another exemplary embodiment of the present invention.

FIG. 7 shows a cylindrical battery 200 comprising a cylindrical electrode assembly 210 comprising a positive electrode plate 213, a negative electrode plate 215, and a separator 214 that is interposed between the positive electrode plate 213 and negative electrode plate 215 to insulate them from each other while being wound together with them. The positive electrode plate 213 comprises a positive electrode collector, positive electrode active materials that are applied to a part of the positive electrode collector, a positive electrode uncoated portion of the positive electrode collector that has no positive electrode active material applied to it, and a positive electrode tab 211 that is coupled with the positive electrode uncoated portion. The negative electrode plate 215 comprises comprising a negative electrode collector, negative electrode active materials that are applied to a part of the negative electrode collector, a negative electrode uncoated portion of the negative electrode collector that has no negative electrode active material applied to it, and a negative electrode tab 217 that is coupled with the negative electrode uncoated portion.

The cylindrical battery 200 in FIG. 7 further comprises a cylindrical case 220 and a cap assembly 230. Insulation plates 212 and 216 are provided at upper and lower portions of the electrode assembly 210 to prevent the electrode assembly 210 from making contact with the cap assembly 230 and the cylindrical case 220, respectively. The cylindrical case 220 comprises a cylindrical sidewall section 221 having a predetermined diameter for accommodating the electrode assembly 210 therein and a lower plate 222 for sealing a lower portion of the cylindrical sidewall section 221. An upper portion of the cylindrical sidewall section 221 is opened to receive the electrode assembly 210. The negative electrode tab 217 is coupled with a center portion of the lower plate 222 of the cylindrical case 220, so the cylindrical case 220 plays the role of a negative electrode. In general, the cylindrical case 220 comprises aluminum, iron, or alloys thereof.

In addition, the cylindrical case 220 comprises a clipping part 223, which is bent inwardly from an upper end portion of the cylindrical case 220 to press an upper portion of the cap assembly 230 that is coupled with the opening formed in the upper portion of the cylindrical case 220. Furthermore, the cylindrical case 220 has a beading part 224, which is formed at a lower portion of the cap assembly 230 and is dented inwardly to press the lower portion of the cap assembly 230. The cap assembly 230 may also comprise a safety vent 231, a current interrupt device (CID) 232, a secondary protective device 233, a cap-up 234 and an insulation gasket 235. The positive electrode tab 211 is coupled with a lower portion of the safety vent 231.

An identification mark may be formed on at least one of the positive electrode tab, the negative electrode tab, the positive electrode uncoated portion, the negative electrode uncoated portion, the cylindrical case, and the cap assembly.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A cylindrical battery, comprising:
   a cylindrical electrode assembly comprising a positive electrode plate, a negative electrode plate, and a separator that is interposed between the positive electrode plate and negative electrode plate to insulate them from each other while being wound together with them;
   a cylindrical case; and
   a cap assembly,
   wherein the positive electrode plate comprises a positive electrode collector, positive electrode active materials that are applied to a part of the positive electrode collector, a positive electrode uncoated portion of the positive electrode collector that has no positive electrode active material applied to it, and a positive electrode tab that is coupled with the positive electrode uncoated portion, wherein the negative electrode plate comprises comprising a negative electrode collector, negative electrode active materials that are applied to a part of the negative electrode collector, a negative electrode uncoated portion of the negative electrode collector that has no negative electrode active material applied to it, and a negative electrode tab that is coupled with the negative electrode uncoated portion, wherein a first identification mark is disposed on at least one of the positive electrode tab and the negative electrode tab.

2. The cylindrical battery of claim 1, wherein a second identification mark is formed on at least one of the cylindrical case and the cap assembly.

* * * * *